Patented June 27, 1939

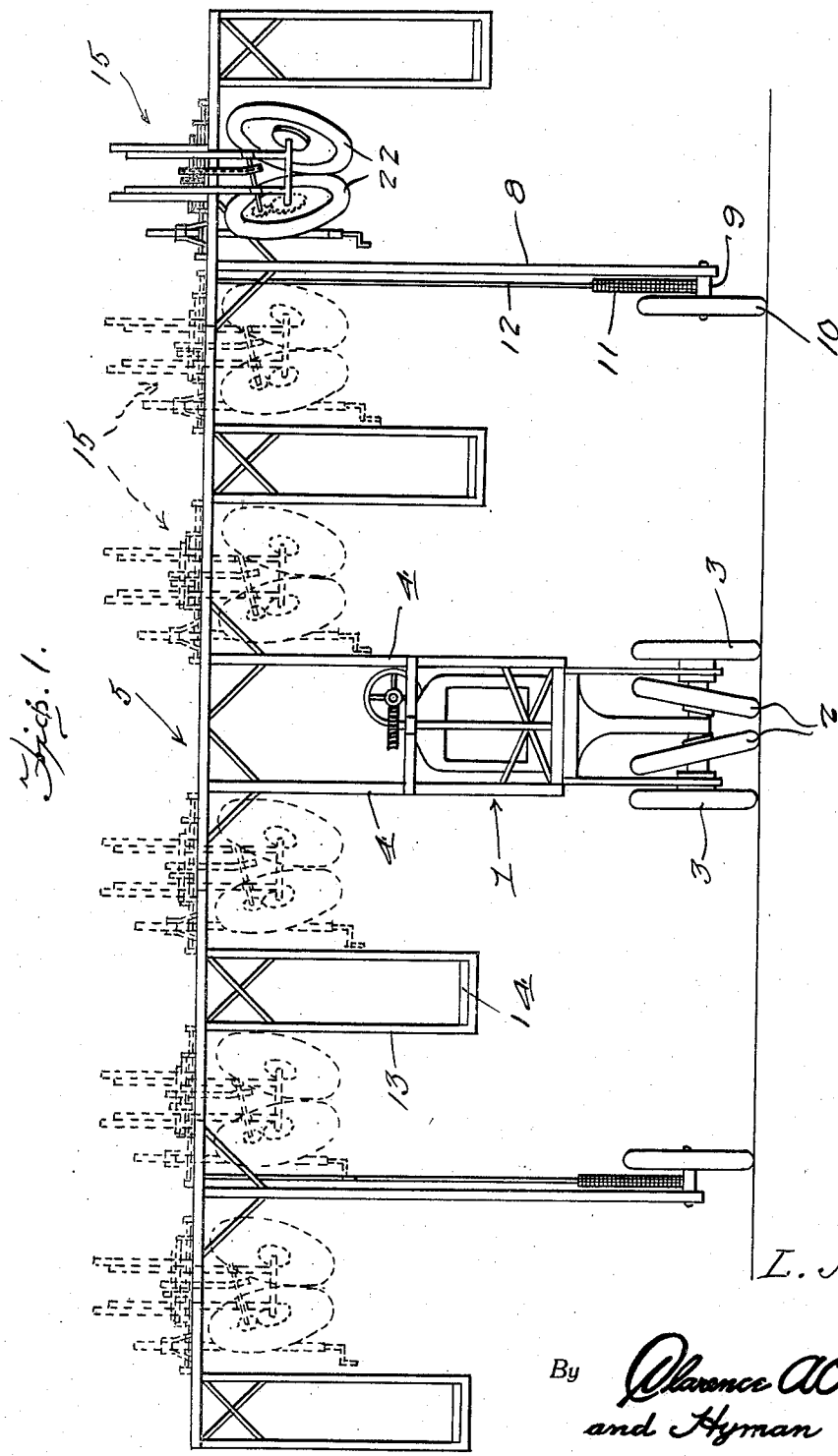

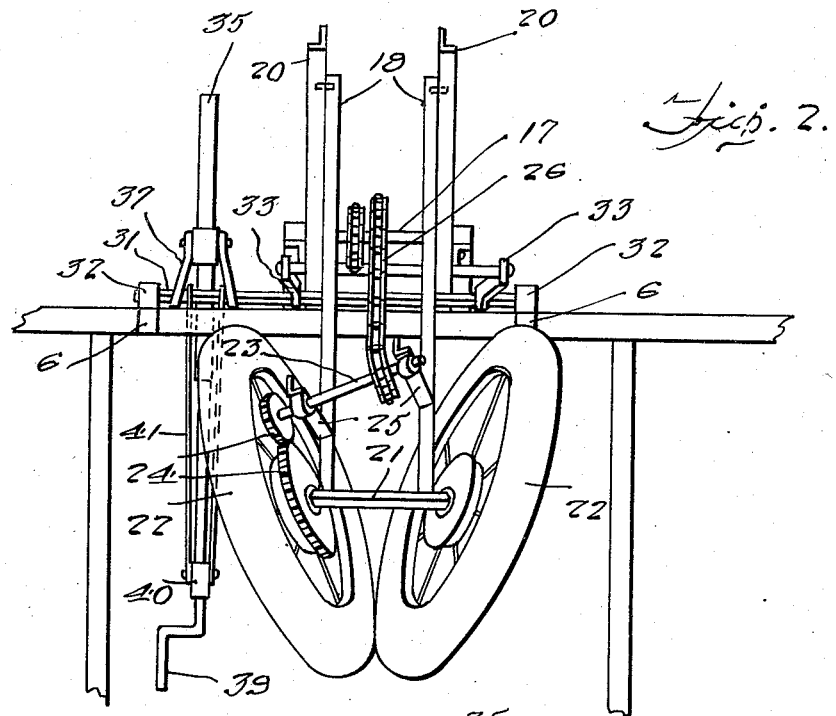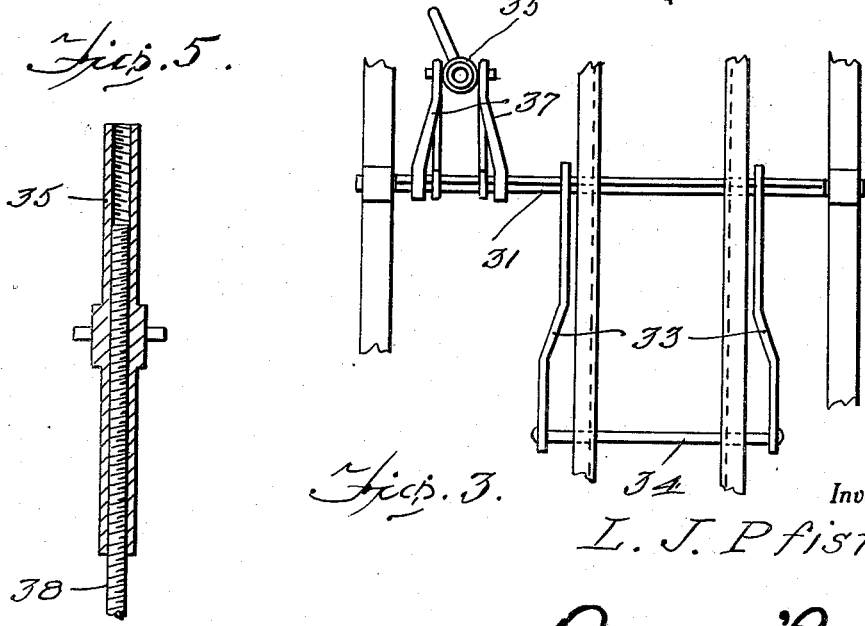

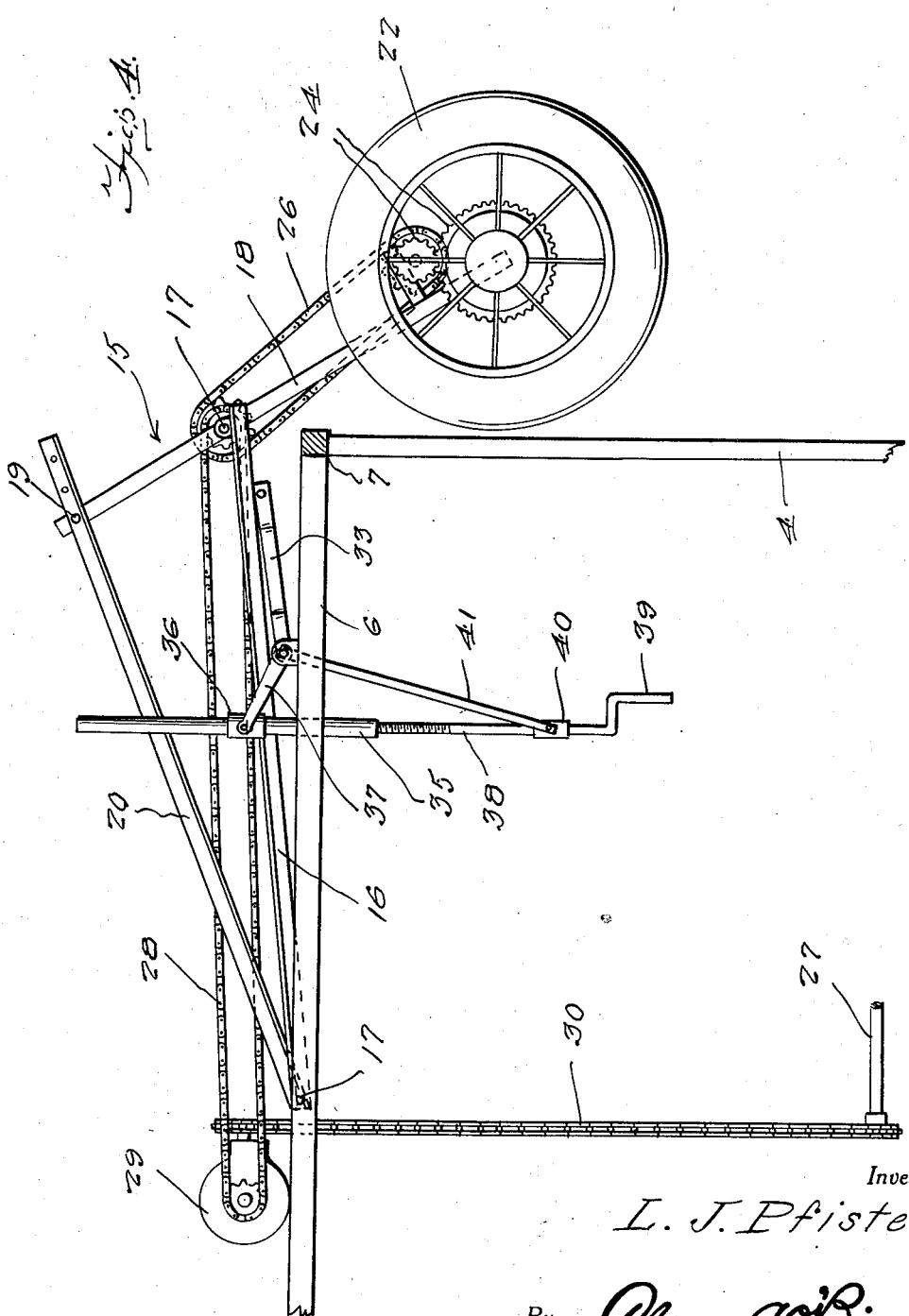

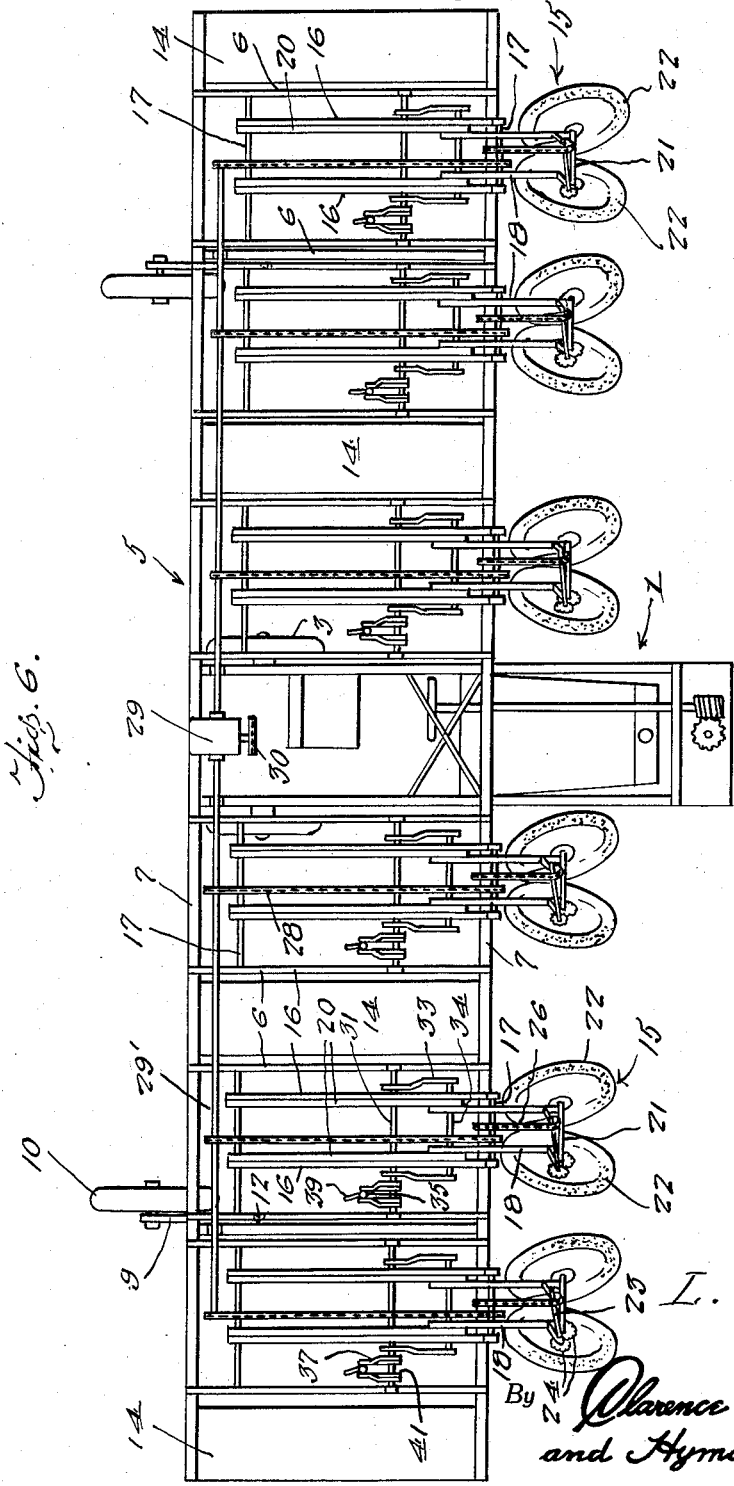

2,163,849

UNITED STATES PATENT OFFICE 2,163,849

AGRICULTURAL MACHINE

Lester J. Pfister, El Paso, Ill.

Application September 13, 1938, Serial No. 229,776

8 Claims. (Cl. 56—15)

This invention relates to new and useful improvements in agricultural machines and particularly to machines of the type disclosed in Patent No. 2,095,007, granted to me under date of October 5, 1937, and entitled "Agricultural machine"; and which type of machine is characterized by being adapted to move under its own power through a field of corn and embodying a novel construction and arrangement for supporting a number of workers in a manner to permit the tassels of a plurality of rows of corn to be removed simultaneously.

The present invention has reference particularly to mechanism for use on such type of machine for pulling the tassels from the corn without injury to the seeds or stalk, thereby obviating the pulling of the tassels by hand as is now generally resorted to.

The invention together with its objects and advantages will be best understood from a study of the following description taken in connection with the accompanying drawings wherein:

Figure 1 is a front view of an agricultural machine embodying the features of the present invention.

Figure 2 is a fragmentary front elevational view showing one of the tassel-pulling devices embodying the features of the present invention.

Figure 3 is a fragmentary top plan view with certain parts of the tassel-pulling mechanism removed.

Figure 4 is a side elevational view of the tassel-pulling mechanism.

Figure 5 is a fragmentary longitudinal sectional view through a manually operable adjusting device forming part of the tassel-pulling mechanism.

Fig. 6 is a top plan view of the machine.

Referring more in detail to the drawings it will be seen that the machine, as more fully disclosed in my aforementioned patent, comprises a motor-driven carrier 1, of narrow gage and having rubber tire-equipped front and rear wheels 2 and 3 respectively.

Rising from the carriage 1 are uprights 4 on which a transversely elongated horizontal frame 5 is mounted. The frame 5 embodies spaced cross-beams 6 connecting front and rear longitudinal members 7.

Depending from the rear beam 7 are bars 8 on the lower end portions of which levers 9 are mounted at intermediate points. Rubber tire-equipped wheels 10 are journaled on one end portion of the levers 9. The other end portions of the levers 9 are yieldably connected to the frame 5 through the medium of coil springs 11 and rods 12.

Also depending from the frame 5 at spaced points on the frame are pairs of hangers 13 and each pair of hangers 13 supports a platform 14.

The machine as thus far described is substantially identical with the machine, as aforestated, more fully disclosed in my above entitled patent. In operation the machine as described, and controlled by a suitable operator in the carrier 1, is adapted to travel through a field of growing corn, the carrier 1 passing between two rows with the platforms 14 and the wheels 10 passing between other rows. Operators occupying the platforms 14 and the carrier 1 may thus rapidly remove the tassels from a plurality of rows of corn simultaneously.

In accordance with the present invention, instead of having the workmen occupying the platforms 14 and the carrier 1 pull the tassels from the rows by hand, there are mounted on the frame 5 tassel-pulling mechanisms 15, the mechanisms 15 being arranged as shown in Figures 1 and 6 whereupon it will be seen that a mechanism 15 is provided for each occupant of the platforms 14 while for two workmen on the carrier 1 there is provided for each a tassel-pulling mechanism 15.

Each tassel-pulling mechanism 15 is supported by a pair of aforementioned cross-bars 6.

As shown, each tassel-pulling mechanism 15 includes a pair of supporting beams 16 which are mounted to pivot on the rod 17 extending between the cross-braces 6 of a pair of such braces. At the forward or free ends thereof the supporting beams 16 are provided with bearings in which are journaled the ends of a shaft 17.

Mounted on the shaft 17 to rock on the shaft as an axis are bars 18 which at the upper ends thereof are adjustably connected as at 19 with brace beams 20 that at one end are also pivotally mounted through the medium of the pivot bar 17.

Mounted on and supported by the bars 18 adjacent the lower ends of said bars is an axle 21 on the ends of which are journaled wheels 22.

The wheels 22 serve as tassel-pulling elements and are arranged at an angle relative to one another so that the peripheries of the wheels approach one another during the course of rotation for gripping therebetween a tassel to be pulled.

The wheels 22 are equipped with rubber tires as shown, the tires forming gripping surfaces or jaws therefor.

One of the wheels 22 is driven directly from a shaft 23 through the medium of suitable gearing 24.

Shaft 23 is mounted on suitable bearing brackets 25 suitably mounted on the beams or bars 18 as shown in Figure 2.

Shaft 23 in turn is driven from shaft 17 through the medium of a suitable chain and sprocket mechanism 26.

All the shafts 17 are driven from longitudinally extending shafts 29' journaled in frame 5, through the medium of chains and sprocket mechanisms 28. Shafts 29' are driven by a suitable differential mounted in a housing 29 and suitably mounted on the frame 5. The differential within the housing 29 is in turn driven from the power take-off shaft 27 through the medium of a chain and sprocket mechanism 30.

It will thus be seen that there is a tassel-pulling mechanism 15 provided for each row of corn and obviously as the apparatus travels through a field the tassels of the rows will be gripped by the complemental wheels of the respective assemblies 15 to the end that the tassels may be rapidly removed from a plurality of rows of corn simultaneously and without any material manual effort on the part of the workmen occupying the carrier 1 and platforms 14.

Means is provided for bodily elevating and/or lowering each assembly 15 and which means may be operated by a workman occupying a platform 14, or the carrier 1 as the case may be. This adjusting mechanism of each assembly 15 includes a shaft 31 that is substantially rectangular in cross section except that the ends thereof, are round and journaled in suitable bearings 32, provided on the cross-braces 6. Connected with the shaft 31 to swing therewith are arms 33 which at one end are connected by a cross-rod 34 upon which rests the aforementioned beams 16. It will thus be seen that as the shaft 31 is rocked for thus raising or lowering the arms 33 beams 16 will raise or lower for elevating or lowering the tassel-gripping wheels 22 as the case may be.

For operating the shaft 31 there is provided a tubular member 35 that intermediate its ends is equipped with a collar 36. Pivoted to the collar 36 are one end of arms 37 which are suitably connected with the shaft 31 to swing therewith.

Threadedly engaged with the tubular member 35 is an adjusting screw 38 provided at its lower end with a crank 39. Also adjacent the lower end thereof there is swivelly mounted on the screw 38 a sleeve or collar 40 to which are pivoted links 41 that in turn are suitably connected at one end thereof with the shaft 31.

Thus it will be seen that by turning the screw 31 the tubular member 35 will be caused to feed on the screw in either of two directions. Obviously this feeding movement of the tubular member 35 relative to the screw 38 will be transmitted through the arms 37 to the shaft 31 for rocking the latter in either of two directions for raising or lowering the assembly 15 as may be desired.

Thus the individual assemblies 15 may be raised or lowered as the height of the rows may require.

It is thought that a full understanding of the operation, construction, utility and advantages of an invention of this character will be had without a more detailed description.

Having thus described the invention what is claimed as new is:

1. A machine of the class described comprising a carrier, a transverse supporting frame mounted in elevated position on said carrier and extending laterally at opposite sides of the vertical plane of the carrier, workmen-supporting platforms suspended from the laterally extended portions of said supporting frame and spaced from one another and from the carrier, and tassel-pulling mechanisms mounted on said supporting frame within convenient reach of workmen occupying the platforms and carrier.

2. A machine of the class described comprising a carrier, a transverse supporting frame mounted in elevated position on said carrier and extending laterally at opposite sides of the vertical plane of the carrier, workmen-supporting platforms suspended from the laterally extended portions of said supporting frame and spaced from one another and from the carrier, ground wheels for supporting the laterally extended portions of the supporting frame and connected with said portions, and tassel-pulling mechanisms mounted on said transverse supporting frame and arranged within convenient reach of workmen occupying said platforms and carrier.

3. In an agricultural machine of the character described, a supporting frame, and a tassel-pulling mechanism mounted on said frame, said mechanism including a structure mounted on the frame for vertical swinging movement, mechanism connected with said structure for raising and lowering the latter and for securing the same at the desired position of adjustment, and power-driven rotary tassel-engaging and pulling elements mounted on said structure.

4. In a tassel-pulling mechanism for agricultural machines, a supporting frame, a pair of beams pivotally mounted at one end on the supporting frame, bars depending from said supporting beams at the free ends of the latter, an axle supported by said depending bars, angularly related complemental tassel-gripping elements rotatably mounted on said axle, and means for rotating said tassel-gripping elements.

5. A machine of the class described comprising a carrier equipped with a power take-off shaft, a supporting frame mounted in elevated position on said carrier and extending laterally therefrom, a tassel-pulling assembly mounted on said supporting frame, and driving mechanism connecting said assembly with the power take-off shaft of the carrier.

6. A machine of the class described comprising a carrier equipped with a power take-off shaft, a supporting frame mounted in elevated position on said carrier and extending laterally therefrom, a tassel-pulling assembly mounted on said supporting frame, and driving mechanism connecting said assembly with the power take-off shaft of the carrier, said assembly embodying a pair of supporting beams pivotally mounted on the supporting frame, angularly related driven wheels mounted on one end of said beams and cooperating for gripping therebetween and pulling a tassel, and manually operable mechanism for swinging said beams vertically to raise and lower said tassel-pulling assemblies.

7. A machine of the class described comprising a carrier equipped with a power take-off shaft, a supporting frame mounted in elevated position on said carrier and extending laterally therefrom, a tassel-pulling assembly mounted on said supporting frame, and driving mechanism connecting said assembly with the power take-off shaft of the carrier, said assembly embodying a pair of supporting beams pivotally mounted on the supporting frame, angularly related driven wheels mounted on one end of said beams and cooperating for gripping therebetween and pulling a tassel, a shaft mounted on said supporting frame, an arm assembly mounted on said shaft to rock therewith and engaging said supporting beams for transmitting rocking movement of said shaft to said beams, an adjusting screw assembly, and including a tubular member and an adjusting screw threadedly engaged therewith, arm assemblies connecting the tubular member with the aforementioned shaft, and links connecting the adjusting screw with said shaft whereby upon rotation of said screw said tubular member will be fed therealong in the desired direction for rocking said shaft thereby causing a raising and lowering of the aforementioned beams.

8. In a machine of the class described, a supporting frame, beams pivotally mounted at one end thereof on said frame, bars pivotally connected intermediate their ends to the free ends of said beams, brace beams for the first-mentioned bars pivotally mounted on said supporting frame through the medium of the aforementioned pivot for said beams and having free ends adjustably connected with one end of the first-mentioned bars, power-driven tassel-gripping and pulling wheels mounted on the first-mentioned bars at the free ends of the latter and arranged in angular relation for complemental gripping action, mechanism for driving said wheels, and manually operable means connected with said beams for raising and lowering the latter.

LESTER J. PFISTER.